(12) United States Patent
Carrier

(10) Patent No.: US 7,478,817 B1
(45) Date of Patent: Jan. 20, 2009

(54) ALL-TERRAIN HOSTILE ENVIRONMENT VEHICLE

(75) Inventor: Brian Carrier, Wyoming, IL (US)

(73) Assignee: Carsaf, LLC., Columbia, SC (US)

( * ) Notice: Subject to any disclaimer, the term of this patent is extended or adjusted under 35 U.S.C. 154(b) by 465 days.

(21) Appl. No.: 11/161,750

(22) Filed: Aug. 15, 2005

Related U.S. Application Data

(60) Provisional application No. 60/601,451, filed on Aug. 13, 2004.

(51) Int. Cl.
*B62D 11/02* (2006.01)
*B60F 3/00* (2006.01)

(52) U.S. Cl. ............... 280/6.48; 280/6.2; 440/12.5; 169/52

(58) Field of Classification Search .............. 180/6.2, 180/6.24, 6.48; 440/12.5; 114/364; 169/52
See application file for complete search history.

(56) References Cited

U.S. PATENT DOCUMENTS

| | | | | |
|---|---|---|---|---|
| 4,579,073 | A | * | 4/1986 | Sadler et al. .................. 114/1 |
| 5,383,630 | A | * | 1/1995 | Flatten ..................... 244/118.6 |
| 6,029,750 | A | * | 2/2000 | Carrier ........................ 169/52 |
| 6,739,281 | B1 | * | 5/2004 | Grimes ....................... 114/364 |
| 2005/0003715 | A1 | * | 1/2005 | Hewitt ....................... 440/12.5 |

* cited by examiner

*Primary Examiner*—Tony H. Winner
(74) *Attorney, Agent, or Firm*—R. William Graham

(57) ABSTRACT

An all-terrain vehicle equipped for quick exchange of its functional components and aid units includes a frame having a mounting platform which includes a plurality of spatially positioned open surfaces, a functional unit having a quick release connector adapted to connect to the functional unit to a first part of the mounting platform, and wherein the frame is made of a polymer-matrix and metal-matrix composite.

17 Claims, 5 Drawing Sheets

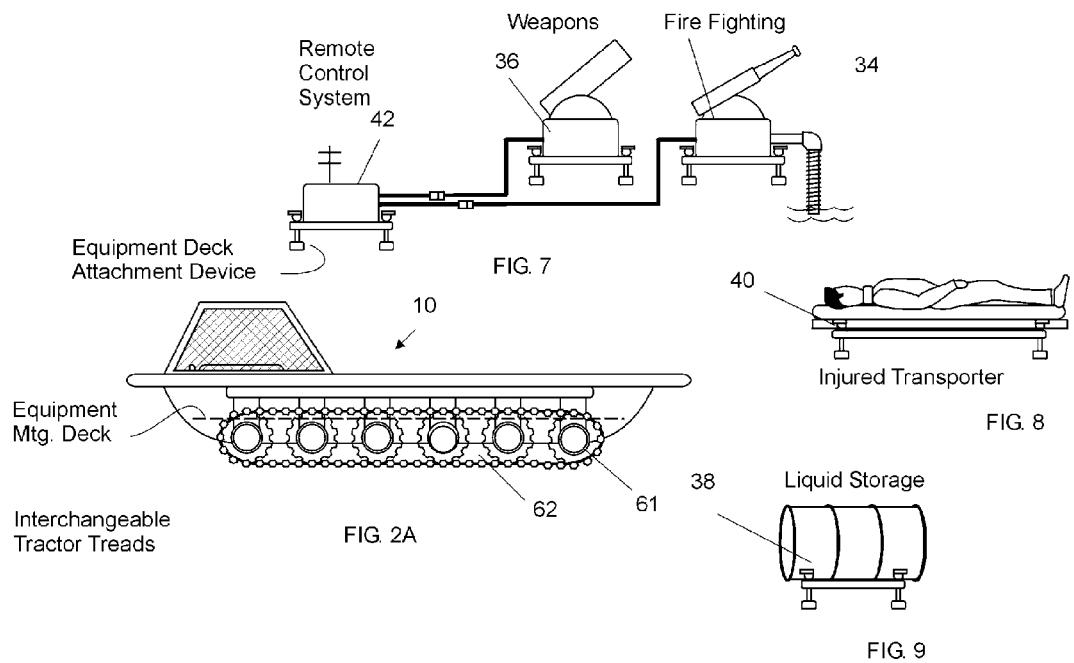
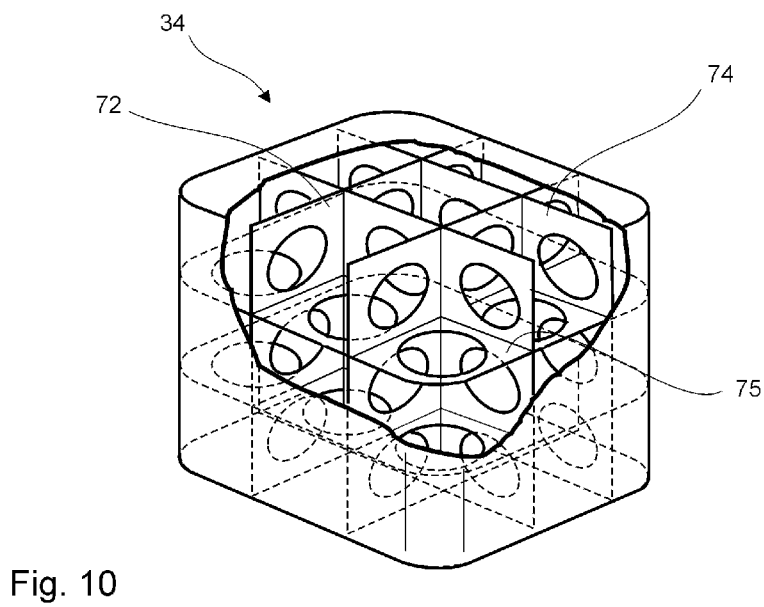
Fig. 10

Equipment Quick Clamping Device

Components and Equipment

ALL-TERRAIN HOSTILE ENVIRONMENT VEHICLE

This application claims the benefit of earlier filed application U.S. Ser. No. 60/601,451 filed Aug. 13, 2004.

BACKGROUND OF THE INVENTION

1. Field of the Invention

The present invention relates to a multi-purpose all-terrain vehicle. More specifically, the present invention is directed to an all-terrain hostile environment vehicle equipped with various aid units such as quick exchange medical, hazardous material, search, rescue, communications, fire fighting, and weapon units which can be deployed in remote areas or areas not accessible by paved roads.

2. Discussion of Background

Current hostile terrain vehicles of the type used in police, rescue and military applications have historically included tanks, trucks and jeeps, for example. While these vehicles have been effective, they have not been found very efficient for quick response scenarios in certain hostile environments i.e., (terrain as well as inclement weather particularly when the two are mixed). Further, due to the very nature of the conditions in which the vehicles can be deployed, one or more of the vehicles mechanical or armaments, equipment components can become damaged or disabled during the vehicles use. They are often too large, slow moving, or ill-equipped to handle a variety of potential deployment needs in which now require relatively light weight, fast moving, highly mobile, low profile signature vehicles which can be rapidly deployed onto land or water and quickly equipped or reequipped, armed or rearmed, predetermined or re-determined with one or more quick exchange equipment component packages.

In many instances deployment of many military conventional vehicles and equipment and armament systems is not practical or has limited utility. The terrain may be sandy, mountainous, muddy, swampy, jungle, or covered with snow, ice, mines, obstructions, vegetation, trees and in cities the roads may be to narrow to traverse. It is evident that there is a need for a more effective means to transport to and then deploy vehicles, weapons system packages, equipment, logistics, personnel and wounded and injured over areas of ground having difficult terrains.

There is a need for an all terrain vehicle to be as lightweight and mobile as possible. There is a need for a solution to tire problems which occur in the field. There is also a need for improved remote weapons systems. There is a further need for improved vehicle durability for an all-terrain vehicle, during periods of war in foreign lands.

In many instances deployment of conventional aid equipment is not practical or has limited utility. There is a need for a more effective way to transport aid equipment and personnel over areas having difficult terrain and for transporting injured persons. In addition, there is need for a vehicle that can solve all of the above problems.

SUMMARY OF THE INVENTION

It is an object of the invention to provide an improved all-terrain vehicle.

A further object is to provide a multi-purpose vehicle.

Another objective is to develop a small lightweight amphibious tactical assault vehicle.

Another objective is to develop a small manned or unmanned robotic amphibious ground vehicle.

Another objective is to develop a small manned or unmanned autonomous ground amphibious vehicle.

Still another object is to provide a vehicle which is equipped for quick exchange of all its functional components and aid units.

Accordingly, the present invention is directed to an all-terrain vehicle equipped for quick exchange of its functional components and aid units. The vehicle is lightweight and stable when traveling over rough ground and includes a frame having a sealed hull to provide the vehicle with buoyancy. A platform exists on the frame above the hull which includes a plurality of open surfaces through which a quick release connector may be inserted to secure a functional unit or aid unit to the platform.

The hull can be made of polymer composite material which includes ballistic proof characteristics. The units can be a self contained: operational fire fighting unit; decontamination unit, communications unit; weapons unit; fuel tank; engine unit; transmission unit; medical aid unit; troop transport unit; logistical supply transport unit; etc. To this end, each of these units can be air dropped at a site to immediately engage the enemy, to make ready, replenish or repair a required unit.

Other features and their advantages can be apparent to those skilled in emergency or combat equipment from a careful reading of the Detailed Description of Preferred Embodiments accompanied by the following Drawings.

BRIEF DESCRIPTION OF THE DRAWINGS

In the drawings,

FIG. 2A is a side view of optional tractor tread wheels which can be employed.

FIG. 7 is a side view of a remote control aid unit with quick attachment pivot locks, connected to a weapons aid unit and fire fighting unit which both have quick connect attachments;

FIG. 8 is a side view of a stretcher aid unit with quick attachment pivot locks;

FIG. 9 is a side view of a fuel tank aid unit with quick attachment pivot locks; and FIG. 10 is a perspective view of a baffle system used in the tanks of the present invention.

DETAILED DESCRIPTION OF PREFERRED EMBODIMENTS

Figures 1, 2, 5:
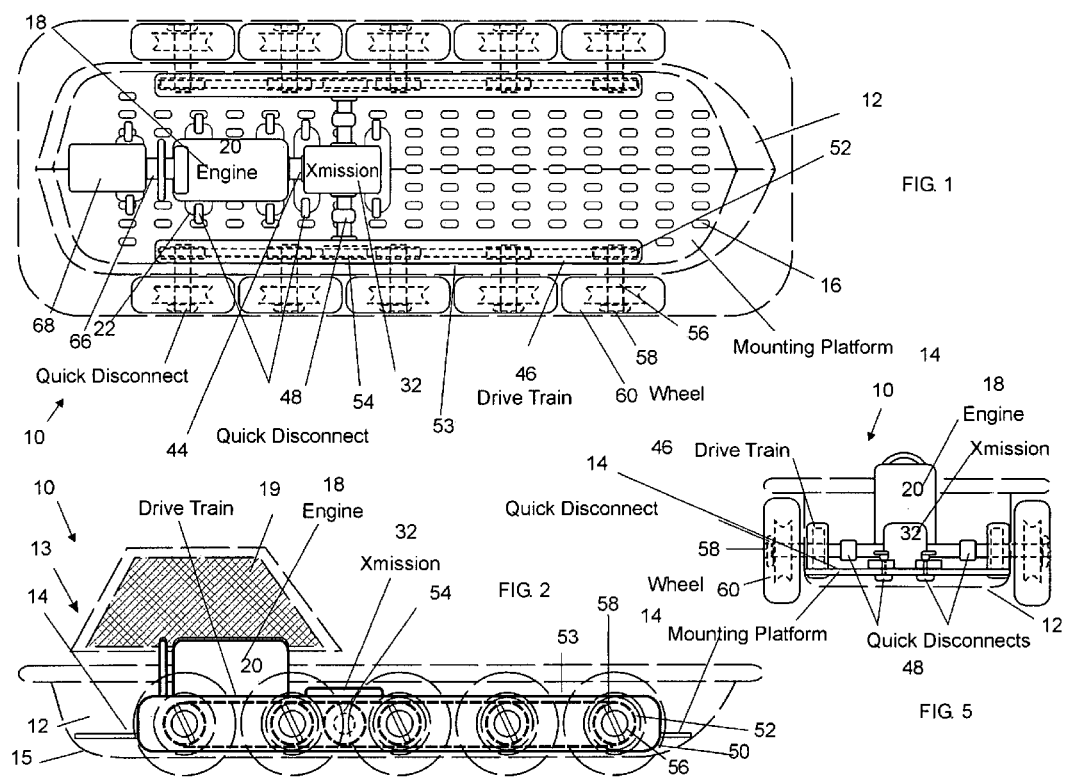
FIG. 1 is a top view of a vehicle according to a preferred embodiment of the present invention.
FIG. 2 is a side view of a vehicle according to a preferred embodiment of the present invention.
FIG. 5 is a sectional view of the vehicle of the invention.
Figure 3:
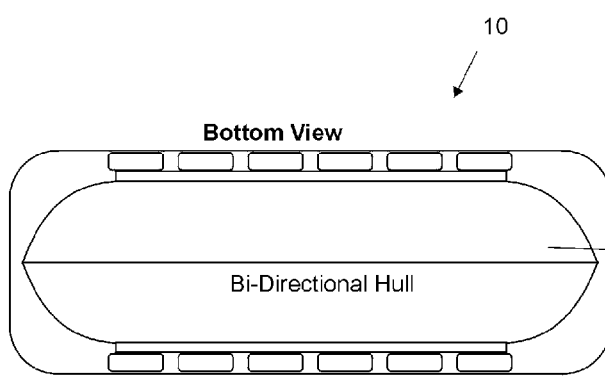
FIG. 3 is a bottom view of another embodiment of the vehicle according to a preferred embodiment of the present invention.

Referring now to the figures, there is shown an all-terrain vehicle 10 according to the present invention. The all terrain vehicle 10 includes a sealed hull 12 having a platform 14 operably disposed within the hull 12. The platform 14 includes a plurality of elongated mounting surfaces 16.

To this end, the vehicle 10 and equipment configurations can be air delivery capable i.e., via a sling, parachute and touch and goes as well as surface water delivery to enable connection thereof to the platform 14 as can be described herein. The hull's upper body 13 and lower body and 15 of the vehicle 10 can be made of polymer composite ballistic resistant materials.

The platform 14 can be equipped for "quick exchange" of all of vehicle functional mechanical components, weapons armaments and equipment configurations and towing capabilities. Vehicle 10 can be lightweight and stable for traversing over rough terrain and can have a chassis frame system to accommodate various drive mechanisms.

The hull 12 can be substantially sealably molded for providing buoyancy for water crossings and provide way for necessary functional attachment of units. For example, the hull 12 can optionally be molded with axle holes therethrough to provide for axle shafts to be passed therethrough and connect with one or more each wheels to provide a direct drive. The vehicle 10 can be direct all wheeled drive (8, 10, or 12 wheeled drive). All axles can be in a split splined design configuration (one splined axle shaft along with a splined female mating coupling) can be permanently attached inside the vehicle hull 12 on a sub frame assembly, with the other splined axle shaft end being capable of being inserted into the splined female mating coupling enabling the splined axle shafts to be separated. Pivot or shaft (single or double action) push button ball bearing positive locking pins can be inserted through the splined female mating coupling and the splined axle shafts to lock the two axle shafts together thereby becoming quick release and quick exchange axles. Sub frame structural assemblies can preferably be made of composite ballistic proof materials or in a joined combination with steel or another suitable material.

Figure 11:
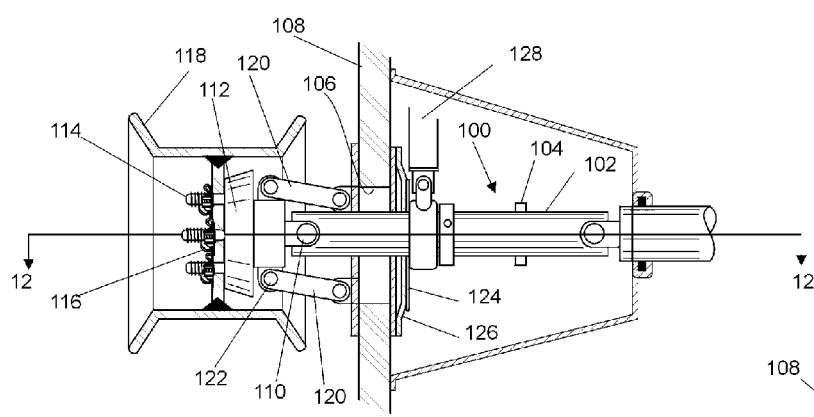
FIG. 11 shows a side section view of an axle and rim portion of for use with the invention.
Figure 12:
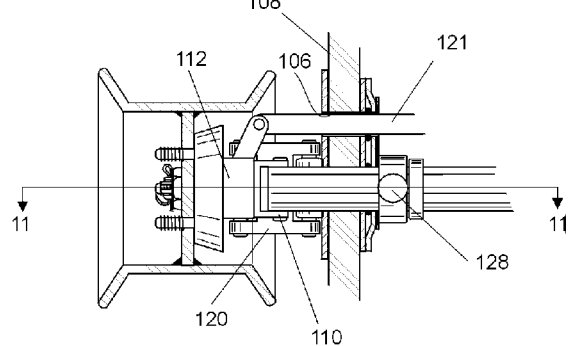
FIG. 12 shows a top section view of the axle and rim portion in FIG. 11.

As seen in FIGS. 11-12, there is shown a front wheel turn steer mechanism. An axle portion 100 universally connects to an axle portion 102 connected to a transmission unit of the vehicle 10. As described these can be splined connections with a locking pin 104 interconnecting the parts. The axle portion 100 extends through an oblong bearing surface 106 of a frame portion 108 and has an end equipped with a quick connect pivotal mount 110 which connects to a hub 112. The hub 112 includes a plurality of plurality of shanks 114 equipped with quick connect locking pins 116 in which to quickly enable mounting of a tire rim 118. A steering arm 121 is operably connected to the hub 112. A pair of H-shaped support linkages 120 pivotally interconnect the hub 112 to the frame portion 108 via quick connect locking pins 122. A flange plate 124 and accompanying sealing member 126 operably disposed therein are mounted to the frame portion 108 in a manner to aid in sealing about the axle portion 100 as is travels in the bearing surface 106. A hydraulic piston 128 connects to axle portion 100 and can be controlled to actuate the position axle portion 100 within the bearing surface 108, up or down.

The hull 12 can be designed keeping in mind heights, widths and length characteristics to match the heights, widths and lengths of various aircraft cargo holding bays to include aircraft width threshold. The upper body 13 within the cab or crew area can be designed in a user friendly manner so radios and other equipment can be within easy reach of the crew members individual area of operations as well as all entry and exit doors can be user friendly and easy to open and close from both inside and outside the vehicle 10. Storage containers can also be designed in such a manner to facilitate easy to reach, store and retrieve battlefield gear (MOLLE gear, alice packs, CLBVs-combat load bearing vests, BCFG-basic combat field gear, etc.

As is described herein, a plurality of platform mounting surface 24 can be formed on the frame system inside the hull 12 which can include a plurality of open surfaces and holes through which quick release connectors (pivot locks 26) can be inserted to attach and secure all functional mechanical components, weapons armaments, communications, firefighting equipment and pumps, pump engines, foam systems, dry chemical systems, split cell foam tanks, water hoses, nozzles, water tanks, special operations, laser, electrified water and or slippery slime tanks, microwave impulse equipment, water cannon, hazardous materials decontamination, search, rescue, medical, surveillance, cargo, transport, fuel tank, vehicle engine, transmission, wiring connectors, wire harnesses, instrument panels, access panels, computer, doors, windows, hatches, sensors, imaging equipment, etc, all of which can be equipped with mounting flanges 22 and pivot or shaft (single or double action) push button ball bearing positive locking pin system as used in the engine/transmission mounting platform described herein.

The vehicle 10 includes a self contained (main vehicle drive power plant), engine unit 18, (that can be P-8 compatible, gasoline, diesel, hybrid-electric, propane, natural gas or a combination thereof) and be of the scaleable engine technology where as a specific horsepower engine can be used for instance 71 horsepower or 165 horsepower or 172½ horsepower etc. which can include engine housings with flanges 22 extending laterally from the engine for mounting. The flanges 22 include an open aperture 24 through which a pivot or shaft (single or double action) push button ball bearing positive locking pins 26 can extend. The pivot or shaft (single or double action) push button ball bearing positive locking pins 26 can have a handle 28 with an elongated head 30 which can be configured smaller, but in a similar shape, allowing the alignment and insertion of the pivot or shaft (single or double action) push button ball bearing positive locking pins 26 into the elongated mounting surfaces 16. This can secure the engine unit 18 to the mounting platform allowing the engine unit 18 to be quickly connected and disconnected from the platform 14.

A protective engine cage 19 can also be equipped with flanges 22 and pivot or shaft (single or double action) push button ball bearing positive locking pins 26 to provide additional protection to the engine unit 18 as well as the occupants. The protective cage 19 can also have a rear access door (not shown). This can allow for the engine protective cage 19 to be quickly removed and reinstalled. Additionally, all vehicle (main vehicle drive), transmission mounting platforms can be configured in the same manner as the engine unit 18 and engine protective cage 19 platforms allowing for the same quick disconnection for the transmission.

Figure 6A:
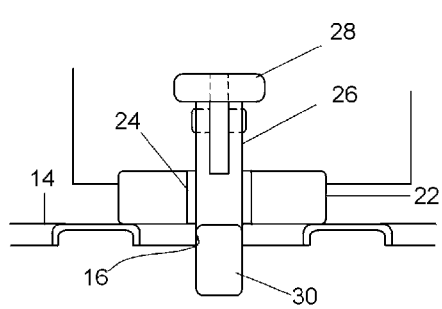
FIG. 6A is a side sectional view depicting insertion of a quick attachment pivot lock through a mounting surface of a part of the vehicle.
Figure 6B:
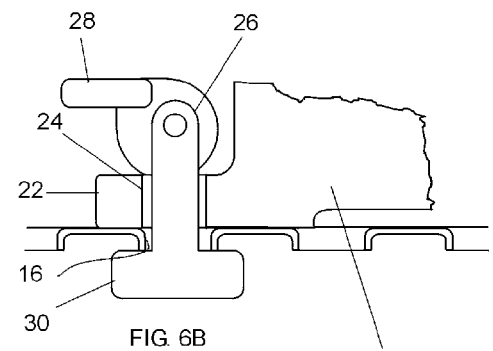
FIG. 6B shows side sectional of the pivot lock in a locked position to the mounting surface.
Figure 6C:
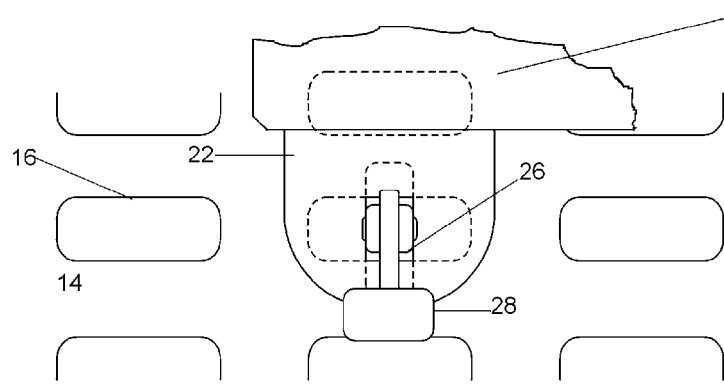
FIG. 6C shows a top view of the pivot lock on in use on vehicle holding part of an aid unit for use on the vehicle according to a preferred embodiment of the present invention.

The operation of the pivot lock 26 can best be seen in FIGS. 6A-6C wherein FIG. 6A shows insertion of the head 30 through the mounting surface 16 in an alignment therewith. FIG. 6B shows pivot lock 26 in a closed and locked position with the head 30 transverse to the mounting surface 16 to secure the flange 22 to the platform 14. FIG. 6C shows a top view of the pivot lock connection. Thus, the engine unit 18 (or other component) can be quickly connected to platform 14. In addition, handrails may be provided to facilitate the removal of any unit for quick attachment to the vehicle 10.

Additionally, transmission unit 32, fire fighting/decon unit 34, weapons unit 36 fuel unit 38, stretcher unit 40, remote control unit 42 can all be equipped with similar flanges 22 and pivot locks 26. The present invention provides better stabilization within weapons systems eliminating the need to stop to find out what as the system provides for easy addition of a missing or needed component for a mission. This also deprives the enemy of the chance to detect what is to be transported for a mission.

The fire fighting/decon unit 34 systems preferably includes cross over capabilities to perform hazardous material decontamination operations by merely the flip of an electronic switch and or a manual over-ride to the valve flow system. The unit 34 can be equipped with quick release pump systems that can provide various pressure and volume outputs to flow sufficient volumes of water and or foam and or dry chemicals in a fire and or hazardous materials decontamination mission from a distance that can not endanger the operator or crew members of the vehicle 10 and enable one to quickly change from one flow rate and pressure to another as the mission dictates such as from fire to hazmat to weapons to DEW (Directed Energy Weapons) to crowd control in seconds. The unit 34 can include pump systems which have the capabilities to quickly change from flow rates and pressures of High Pressure/Low Volume, to Low Pressure/High Volume, to Low Pressure/Low Volume, to Pressure/High Volume in "joint" work together or independent pump systems and all pump systems can be draft capable, such as gross decontamination of men and equipment to include vehicles, downed aircraft, buildings, civilians, ect; in remote area's of the world during or after a chemical agent and or gas agent (Dirty Bomb), release by an opposing enemy or terrorist cell. Hose and attachment therewith can preferably be equipped to have quick release couplings. The unit 34 can be self powered (e.g., independent engine) or can be powered by the vehicle engine unit 18 through stacked hydrostatic or hybrid electrical drive systems. Vehicle and secondary engines of the combustion type can be electrically started and all engine horse powers can be predetermined to be capable to give the necessary power to drive the intended function(s) of the engine.

The engine unit 18 can be operably connected to the transmission unit 32 by a quick connect clamp 44. In one embodiment, a drive train 46 can be operably connected to the side of the vehicle 10. A quick connect drive linkage 48 connects the transmission unit 32 to the transmission unit 32. The drive train 46 can be chain or belt driven in this embodiment. Chain or belt 50 operably connects to wheels 52 within a housing 53 which are configured to be complementary with the chosen drive, for example, a chain system would utilize a suitable sprocket on each wheel 52 for engagement therewith.

Figure 4A:
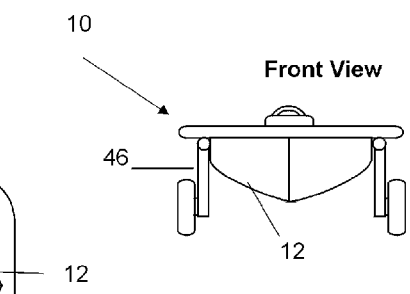
FIG. 4A is an end view of the embodiment in FIG. 3 in a first mode of use.
Figure 4B:
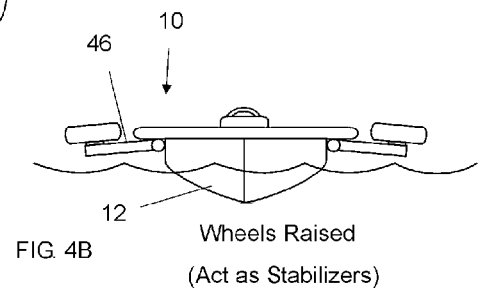
FIG. 4B is an end view of the embodiment in FIG. 3 in a second mode of use.

The drive train 46 includes a drive wheel 54 to drive the belt/chain 50. Each wheel 52 can include a drive shaft 56 which extends outward from the housing 53 and includes an end configured with means 58, such lock pin through a hole in shaft 56, for quick connection of a wheel 60. Alternatively, in another embodiment the drive train housing 53 can be pivotally mounted to the platform 14, for example so that the same can be actuated between two modes, i.e., a land and a water use, as seen in FIGS. 4A and 4B.

In the embodiment of FIG. 2A, vehicle 10 can use tractor treads 62 as seen in FIG. 2A wherein tractor wheels 61 can be quick release. Such means 58 can include a hole extending through the end of the shaft 56 utilizing a locking ring pin. The treads 62 can include a band type track system having a high-performance, low maintenance alternative to segmented metal type tracks/treads that are traditionally used for tracked combat vehicles today. Band type tracks are light weight and continuous, travel smoothly around the wheels with a minimum amount of noise and vibration. This drastically reduces noise and dust and the vehicle 10 foot print signature and can enhance the survivability of the vehicle 10. This can also reduce the amount of (drag) rolling resistance normally associated with track systems and can there-by improve the vehicles agility in the field. Band type track systems also offer significant track life cycles and can reduce the over all cost due to a reduced maintenance cycle with a much longer life span. Wheels 61 can have tractor/tank treads 62 wherein links of the treads can be quick release, quickly separable, enabling the vehicle 10 to be deployed and operable with or without using the treads 62. This can be accomplished by a hole being molded into the tread links extending through the link from one end to the other and inserting a solid shaft locking ring pin through the hole. The tread links can be of a type manufactured using composites incorporated along with rubber to form the links.

Shock absorbers can be employed on the vehicle 10 with quick release capabilities. Alternatively, it may be preferred to use low pressure tires (15 to 25 psi) that provide both shock absorption as well as a very low ground pressure achieving a 10 to 15 psi ground pressure using only the tires and 5 to 10 psi with the read/track system employed. This would enable the vehicle 10 to operate with or without a shock absorption system. Shock absorbers can be employed on the vehicle with quick release capability or a pneumatic system employed to control air volume in the wheels 60 to enable the vehicle to operate with or without shock absorbers. The present invention also contemplates that by removing the need for central tire inflation systems, this would eliminate the confusion the driver or crew faces while in, or after, a combat situation to select from snow/mud, cross country/highway tire control settings.

It is contemplated that a direct drive system can be employed wherein one or more wheels is driven by a drive shaft with suitable yoke connections, a hydrostatic drive transmission or via a hydraulic system as is known in the art. One or more drive systems can be employed on the vehicle 10 providing the user with multiple drive mechanism options.

The drive train connection can be either/or a combination of/direct drive shaft utilizing a suitable yoke system, hydrostatic, belt or chain. The direct shaft, hydro-static, belt or chain drive or drives or a combination thereof can connect to the driven axles within a housing which can be configured to be universally complementary with the chosen drive or drives, i.e., a chain system would utilize a suitable sprocket on each axle as the drive engagement mechanism. An objective achieved here is to incorporate a back up drive train for an "emergency switch-over" in the event one drive train becomes inoperable. This can be accomplished by using one or more methods: shaft over hydro-static, shaft over chain, shaft over belt, hydro-static over chain, hydro-static over belt, belt over chain. This can be accomplished by using a variety of mechanical components such as electromagnetic spring plates, electromagnetic clutches (such as the same used on simple automotive air conditioning systems), or air/hydraulic positive pressure clamps, centrifugal clutches using drive pulley to driven pulley (belt, chain, hydro-static actuated), power take off, (pto), back up configured separately from the transmission, located on the engine to be connected to the drive train, to independently stacked hydro-static drives that can be mechanically driven by either the engine, electronically or the transmission or both using a combination of manual over electronic solenoid valves in the event the solenoid valve falls to open it can be opened manually. The drive train can also be configured in such a manner where as one or more wheels can be driven by one or more drive component systems. In example, the front two wheels can be belt driven, the next two wheels being hydro-statically driven, the next two wheels can be chain or direct drive shaft driven or electronically driven in a multitude of various configurations.

In an embodiment, the vehicle 10 is equipped with steering and braking components adjacent the wheels 60 and can be steered via a conventional wheel turning mechanism or via a skid steer method whereby one or more wheels 60 are braked to effect a turn of the vehicle 10. This will give the vehicle 10 the ability to switch back and forth from the turn steer mode to the skid steer mode through the flip of a switch. The vehicle 10 forward and reverse motion can be achieved by the drive train 46. The multi steering capability enables the vehicle 10 to be placed into a highway mode of steering like that of an automobile on standard paved and unpaved road networks and then changed to skid steer type steering for greater steering mobility when needed as in combat escape and evade or weapons set up and deploy maneuvers, rough terrain or congested areas such as city streets enabling all vehicles to turn within the length of its own radius. This can be accomplished by incorporating single, double, and triple tiered yoke or universals on the wheels 60 at the point of attachment to the wheel axles, along with electromagnetic plates attached by one plate being attached to the wheel rim and another electromagnetic plate attached to springs enabling the plate to move along the axle through a key way slot in the axle for the two plates to become engaged with each other at a flip of a switch locking the turn steerable wheel or wheels into a skid steer mode and vice versa where as once the electromagnetic plates are disengaged through the flip of a switch the plate attached to the axle also having return springs or a pressurized air or hydraulic ram shaft or electrically actuated connection shaft would return the axle plate to its original position allowing for the wheel or wheels to become turn steerable again.

In an embodiment, the vehicle's 10 forward and reverse motion can be achieved through the drive train 46 (which can include those mentioned) to affect an emergency switch over from one drive train to another in the event a drive train failure occurs in one particular drive train. The transmission contemplated by the invention can be of a type configured using a torque converter driven, 3, 6 or more speed power-shift transmission. The transmission can be controlled by a microprocessor which can respond from the shift lever position input. The transmission can be programmed to be fully automatic through all three, six or more speeds or manually controlled, 1st through 3rd, and then automatically in 4th through $6^{th}$ or more, in a 6 or more speed transmission. The transmission can also have programmable down-shift inhibit points programmed into the micro-processor which would prevent the transmission from reacting to a down-shift signal if the resultant engine speed, revolutions per minute, (rpm), would result in an engine over-speed and damage situation. This would not allow the downshift until the vehicle slowed to a speed which would not damage the engine after being down-shifted into the new gear range. This same feature can also be programmed into the transmission unit 32 to prevent accidental directional shuttle shifting at speeds which would cause a drive line package damage or operator's discomfort, i.e., neck and back injuries, (whip lash). The transmission can be reprogrammed to fit the vehicle 10 particular mission needs as it is determined or redetermined. This can also be accomplished as previously mentioned through radio frequencies, cell, digital, satellite, infra red signals from aircraft such the U.S. Air Force Predator and other aerial drone aircraft. Electric powertrain technologies can also be incorporated using hybridelectric drive transformation designs and technologies that have no mechanical links between the internal combustion engine and the wheels. By operating the vehicle in electronic only drive mode, the acoustic, (exhaust sound characteristics), thermal, (engine and exhaust heat signatures), can be greatly reduced to facilitate operations that require covert deployments, in ultra high mobility arena's with silent running capabilities. The engine unit 18 to transmission unit 32 connection can be operably connected by using a quick connect method described herein above.

The vehicle 10 is designed to be drivable on uneven ground, on mud, through deep water, or on other surfaces a regular automobile or truck cannot be driven on. To achieve this effect, the vehicle can be relatively lightweight, having eight, ten or twelve-wheel drive, which is sealed against water intrusion to critical engine and transmission parts, and can be chain driven and geared for low speeds and power. Weight reduction can be achieved by using various polymers which also have ballistic proof capability. The wheels 60 can be formed to provide traction on slippery ground and retract on water. Tractor treads 62 made of synthetic or natural rubber. The transmission unit 32 can include a quick connect 66 for a propeller unit 68 to operate in water.

The tank 34 can be used for fire-fighting and includes a sloshless baffle system 70. The baffle system 70 includes a plurality of panels 72 and 74 disposed transversely to one another using both horizontal and vertical plates of various thicknesses depending on the size of the tank (for structural stability) utilizing varying sized holes in each panel (e.g., hole sizes of less than about an inch can be used). The baffle system 70 provides for relatively constant fluid level within the tank 34. The baffle system 70 prevents uncontrolled upward, downward and side to side fluid movement in rough terrains, sudden stops and starts, and most importantly sudden or quick turns that suddenly transfers the fluids weight energy dangerously in different directions. This also provides the vehicle 10 better stabilization and control characteristics at higher speeds during tight or sharp maneuvering as well as on rough, steep or unleveled terrains. This baffle design can be employed in other tanks on the vehicle 10. The tank 34 is equipped with a pump for providing various pressure and volume outputs to shoot sufficient volumes of water and/or foam and or/dry chemicals toward a fire from a distance that can not endanger the operator of vehicle 10. The user/operator can thereby quickly switch from one flow rate and/or pressure to another as needed. Hoses can preferably be provided with tank 34 and are of a quick connect end couplings as is known in the art.

Engine unit 18 can be fueled by any number of fuels such as gasoline, diesel, propane, electric, hybrid electric, or natural gas and can be used to power the vehicle 10 as well as any of the other units described herein by using a suitable coupling. However, it is contemplated that other units, such as the fire fighting tank 34 can be self powered. The engine unit 18 and any other engine provided is given a predetermined horsepower engine and pump, where required which is capable of running the intended function and is of the type that is electronically started.

A foaming agent can be dispensed from a container (not shown) inside tank 14 that adds foamant to the water in tank 34. Enough foamant of any suitable commercially available, fire-retarding chemical foamants should be provided to foam all the water in tank 34, so that 100 gallons of water can produce approximately 10,000 gallons of foam when the water is discharged through a standard eductor jet nozzle attached to the end of hoses. This foaming system may be controlled by a series of valves or may be controlled from a control panel within the confines of passenger area of vehicle 10', as shown in FIG. 10. Such control panel is equipped to control the valves to activate the foaming system or just water or just dry chemicals and can also include an adjustable valve which enables thickness of the foam expelled through the hoses or water cannon to be changed between heavy and light foam.

For controlling the flow of water in the case where a series of valves and hoses are used, a first valve controls the flow of water through a first hose from tank 34 to a pump; a second valve controls the flow of the water from a second hose through the tank filter; and a third valve prevents water from flowing from master drain. If there is a convenient nearby source of water, such as a lake or stream, the water from the available source can be pumped directly by pump into the fire hoses, or the tank at the same time refilling the tanks water supply and continuing to supply water to the hoses, water tank and cannon thereby providing a continuous uninterrupted supply or flow of water by removing an end cap from pump and simple valve manipulations feeding water therethrough. The water cannon is capable of flowing water, and or foamed water and or dry chemicals at the same time or independently through a dual chambered water cannon with the appropriate corresponding nozzle affixed to each independent chambers output end.

The passenger area of vehicle 10' can be enclosed by roll bars and a wire mesh or steel grate, so that its passengers are protected from debris and other potential hazards. As well as the upper body of vehicle 10 can as well be formed in a separate form or a continuous flow form from the lower body of vehicle 10 comprised from bullet proof composite materials being form fitted with a multitude of multiple angles from 1 degree angles to 95 degree angles to assist in the deflection of enemy munitions striking the vehicle 10 in assisting the ballistic properties of the composite/thermo-plastic materials used in the upper and lower bodies of vehicle 10. The tank 34 can have a first compartment and a second compartment separated by a divider. A first compartment preferably contains about 150 to 350 gallons of water, while a second compartment preferably contains about approximately 15 to 25 gallons of a foaming agent like that described above. The tank 34' can also preferably be divided by a plurality of sections 72, 74 having a number of holes dispersed therein which permit fluid to flow within tank 34', but prevents the fluid from shifting or "sloshing" from one side to the other. Again, it is important for the fluid not to shift, since the center of gravity of vehicle 10' would shift with the fluid, which would in turn increase the chance of vehicle 10' overturning.

In addition, the tank 34 can include a self-contained engine 16' and can be fueled from the same fuel tank or source of power that supplies vehicle 10'. Also positioned along a top of tank 34' can be two storage areas. The first storage area can be enclosed and designed to carry equipment, such as chain saws axes or other fire-fighting equipment. The second storage area can serve as a hose bed enabling a length of hose to be folded upon itself and stored when vehicle 10' is traveling. The hose can be fluidly attached to the pump. A Suction hose can be provided in the second storage area and connected to the pump connected to the tank with a sensor installed within the tank that sends a signal Pressure or Electric or both to a valve connected at the suction input on the pump automatically manipulating the valve system to automatically begin the refilling of the water tank when a determined loss of water level is reached. An adjustable electronic, electronic over air, air over hydraulic, air, hydraulic, automatic, automatic over manual valve system is provided to control the direction of flow of water, foam and dry chemicals through hoses.

A valve system consisting of electronic, air over hydraulic, electronic over air, air, hydraulic, automatic, automatic over manual can control fluid flows between the first compartment and pump, a tank fill valve to which the suction hose may be attached for refilling first compartment when the pump is activated; a water cannon valve that permits fluid to flow therethrough; and a master valve which controls the flow of fluid through fire hose. These controls are preferably within passenger area having sight levels indicating the level of fluid in the first compartment and second compartment and can be monitored via the vehicles on board diagnostics system and monitored by aircraft.

This combination also has several important advantages, such as the ability to transport a pump or other device to direct the water, foam and dry chemicals at the fire, as well as decontamination solutions for decon missions. For example, the pump can force the water, foam and dry chemical and decon solutions through the hose at a higher velocity, thus allowing the firefighters to attack the fire or decon objective from a greater distance than if they were on foot. Furthermore, while it is not practical for a firefighter or group of firefighters to carry a water cannon and then hold and operate it by hand, the present invention does permit the transportation of the water cannon, thus enabling the firefighters to attack the fire or decon objective from an even greater distance. The water cannon is as well capable to shoot streams of water (straight streams, fog, wide streams) of just water, foam, dry chemical or decon solutions in any combination and can be remotely controlled either wirelessly or wired in manned, unmanned and autonomous modes as well the water cannon can be operated manually in the case of a system failure.

Another important feature of the present invention is that the tank, hoses, and pump may be readily removed from the vehicle through the use of quick-release devices. Assuming the water and foam tanks are empty, four firefighters should easily be able to remove the fire-fighting equipment, which would enable the vehicle to be used during a search and rescue. The back portion, or rear deck, of the vehicle is capable of carrying two injured persons while two emergency personnel ride in the vehicle's passenger area. Consequently, transforming the vehicle and enabling it to be used for a different purpose reduces the number of vehicles required and provides greater flexibility to the firefighters, military personnel or other emergency personnel who use the device.

The use of a pump mounted to the all terrain vehicle which is capable of pumping water from a lake or stream onto a fire is another feature of the present invention. This feature reduces the need to transport water to the site of the fire or, in the alternative, makes it easier to transport water pumping equipment to the body of water to be used in fighting the fire.

It can be apparent to those skilled in the art of fighting fires in remote areas that many modifications and substitutions can be made to the preferred embodiments described above without departing from the spirit and scope of the present invention. For example, vehicle 10' may also be provided with a winch 150 or other equipment that can aid the vehicle in its fire-fighting mission or during a search and rescue.

The tank 34 can preferably have a recessed top for storage of hoses, multiple 100-foot hoses, and a large fill orifice, a screen to filter debris that would otherwise clog hoses, pump 18 to refill the tank 34 from lakes, ponds, or streams. Additionally, the tank 34 includes a master drain for flushing and cleaning the tank. In addition, a water cannon may be provided with vehicle 10 and located adjacent the operator to enable use thereof.

The operations of each unit described herein can be performed by remote control unit 42 which is operably quick connectable to each unit on the vehicle 10 having suitable connections therewith. The remote control unit 42 is also equipped with manual controls thereon to provide for operation of the vehicle 10 manually as well as a transceiver equipment enabling it to be reprogrammed on a need to need basis, as well as enabling the vehicle 10 to be remotely controlled via line of sight, gps, or by air via aircraft such as the Preditor. Remote control mechanics, servos, hardware, wiring harnesses can be quick releasable to facilitate easy replacement of any faulty components in case of damage or failure. A manual over-ride can be incorporated should the vehicle 10 need to be taken out of autonomous, unmanned mode for what ever reason and vice versa. For example, in an instance where as the crew could become incapacitated on a mission, the vehicle 10 via radio, satellite, cell, digital or IR (infrared) signals can be placed into remote control operation to continue the mission. This can be accomplished through methods such as using the SAE (Society of Automotive Engineer's), J-1939 standard reader's protocol using the engine and transmission ECM (Engine Control Module) and ECU (Engine Control Unit) and transmission data reader's through the use of pressure regulators linked with On Board Diagnostics (OBD-2) 16 or more pin connector linked to various communication signals such as "Blue Tooth", communication transmissions to send all relevant and pertinent engine, transmission, weapons system data to and from the aircraft allowing the aircraft and the vehicle 10 to communicate with each other through vehicle 10's on-board computer software to convert any incoming wide spectrum of broadband signals, radio frequencies (UHF, VHF, Low Band, High Band, etc.) cell, satellite, digital or IR (Infra Red) signals into electrical impulses to engage servo's attached to vehicle 10 steering, braking, engine, transmission, weapons deployment and engagement systems, etc., allowing the aircraft to be the forward observers eye's (FO), for guidance to the vehicle 10. For instance, the aircraft informing the vehicle 10 that it's approaching a ravine and informing the vehicle 10 that it needs to down shift the transmission into a lower gear ratio for more power to negotiate itself at a slower speed to drive into the ravine and having the power to climb back out of the ravine. All pertinent data transmissions can be sent back and forth allowing for all systems monitoring such as vehicle speed, rpm, water temperature, oil pressure, gear transmission, electrical input and output, weapons diagnostics to include arming and disarming as well as including weapons selection if equipped with multiple weapons systems, water tank level, foam tank level, pump water pressure etc. To include all switch functions within the vehicle 10 to be dual use, dual functional e.g.; headlight switch will control the functions of the headlights but can also become the firing switch for the weapons systems and the windshield wiper switch controlling the wind shield wipers but also being capable of becoming the deployment activation switch for the missile launcher or grenade launcher deployment. All switches and switch functions can be reprogrammed or turned off rendering them non-usable to include the engine and transmission in the event the vehicle 10 is commandeered by the enemy using radio, cell, satellite, digital, IR signals etc. via aircraft.

Sensors including Multi-function RF, UAV, Tri-Band Radar, Active Protection Radar, unattended sensors network Sensor Technologies in (Ku, Ka, W-Band, etc.), can be employed into the vehicle 10 using a single electronically scanned antenna (ESA), that are high performance, electric field tunable and temperature insensitive that can be shared between all of the vehicles sensors. Doing so can help to cut costs, lower power consumption and reduce the over-all weight of all of the vehicle 10.

As the trend continues from heavy forces to a much lighter, faster and mobile force this inevitably places more constraints on current sensor systems for engagement lethality and survivability issues. It is contemplated that the vehicle 10 can include improved thermal sensors integrated with cool thermal systems incorporating wide fields of view and narrow fields of view giving the ability to scan more of the field to then zoom and detect various targets. The vehicle can meet the challenge by integrating N-MEMS networked sensor systems and integrated sensor functions and technologies with an end result of better surveillance; active protection, command guidance, field combat recognition, active/passive target acquisition, combat identification, weapons guidance, secure point to point communications, networks for situational awareness and signal intercept sensors that are reduced in size to fit into reduced space that can become integral to help to ensure the survivability of the future lightweight operator within smaller lighter weight vehicles. Another benefit over traditional mechanically scanned antennas can be the added ability to reposition the antennas beam instantly to any given position within the coverage area of the sensors without having to manually or physically move the antenna. Additionally, technologies such as phased array and true-time-delay technologies, using ferroelectric tunable phase shifters, tunable filters for digital receivers, tunable impedance transformers to reduce loss due to impedance mismatch, MEMS phase shifters, millimeter wave integrated circuits (MMICs), and optical control of microwaves in a phased array antenna can be employed. The Rotman lens beam forming technologies for true-time-delay, multiple simultaneous beams can be generated to cover a broad band of the RF spectrum for multi function RF sensing. By applying multi-function radio frequency electronically scanned antenna sensors, real beam radar, direct digital synthesizer and field programmable gate array processing technologies designed for the vehicle's 10 architecture. Algorithms of the sensors can be integrated into the vehicles package, wherein a multi-functional sensor system with two-dimensional electronically scanned antennas, integrated receiver/exciters, flexible waveform synthesizers, high throughput signal processors can compliment the architectural design of all vehicle 10. This reduces the number of antennas and interfaces on the vehicle 10 and can enhance the operability and infuse the inclusion of a multi-functional operating platform that is compact to fit within the scope of the vehicle package.

EO/IR image processing, algorithm technologies can also be incorporated into the vehicle 10 to maximize detection, clutter rejection and identification capabilities of various sensors and missile detection systems. In finding, detecting, engaging and then eliminating threat targets in a battlefield situation, one can encounter situations of partial occlusion to total obscurity. By receiving additional information in the form of multiple views of a potential target through a moveable or moving sensor platform, compiled with reconnaissance data available along with information from additional sensors provide multiple views of the target. Sensors include broadband and multi-spectral passive infrared sensors, imaging laser sensors and hyper-spectral imaging sensors with spatial clutter rejection technologies, and "Acoustic Battle Field" sensors, can also be incorporated into the vehicles design signature. Acoustic sensors built into the vehicle 10 are passive by their nature and can provide real time, non line of site tracking and identification of enemy battlefield targets. Infrasonic sensors provide long range detection and target locating, electronic warfare (EW), countermeasures (ECM), and long range radio transmitters (e.g. base station to satellite), platform (combination or stand alone) systems can also be incorporated into the vehicles host of sensors and electronics. Beam-forming, target classification, identification algorithms, target tracking (using lines of bearing), signature molding and battlefield information validation can be incorporated into the vehicle 10. By incorporating these imaging processing systems and acoustical battlefield sensor technologies into the vehicle platform, the vehicle 10 includes information systems which can be able to track helicopters, locate small arms (individual or sniper), and large (artillery), caliber gun and missile signatures, and track and identify other ground vehicles and importantly the vehicle operator and data analysts, preventing combat fatigue and information overload. The invention significantly reduces decision making in a combat situation by providing a myriad of capabilities herein described and can sharpen the operator's situational awareness, confidence and morale where needed in performing one's job.

Ultra-Wideband Foliage and Ground Penetrating Radar technologies can also be incorporated into the vehicle 10. Low frequency imaging radar technologies, "Ultra-Wideband"(UWB), "Synthetic Aperture Radar," (SAR), and electromagnetic modeling and Short-Pulse Ground Penetrating Radar technologies can be provided in the vehicle 10 platform 14 and can provide the ability to reliably detect a stationary vehicle hidden under foliage as well as subsurface targets such as buried mines and even unexploded ordnance. Other benefits to employing this technology can be detecting negative obstacles (ditches, ravines, cliffs, ponds, lakes, streams, ect), as well as positive obstacles (rocks, trees, buildings, vehicles, bridges, etc). This enhances the vehicle 10 in the autonomous, unmanned robotic mode. Another critical initiative that achieved by employing these technologies into the vehicles system package is to counter-mine, humanitarian demining, and unexploded ordnance (environmental remediation), operations that confront present systems today.

Further, software programs can be included into computer processor ## of the vehicle 10 can include Cobra Command Post Computer Package consisting of Bio-Watch, Guardian Qualitative Assessment Tool (G-QAT), Decision Support System (DSS), Embedded Resources, Guides for Response to include Forensic, Emergency Response, Jane's Chem-Bio, NDPO on Scene Commander's, USAMRIID Medical Management of Biological Casualties, USAMRIID Medical Management of Chemical Causalities, AFRRI Medical Management of Radiological Casualties, MSDS Material Safety Data Sheets, BDR Bomb Dictionary Reader, RIDS Response Information Data Sheets, AIT Agent ID Tool, NFPA 704 Placard Tool, PPE Personal Protective Equipment, Glossary Tool, TSWG Terrorist Bomb Threat Evacuation Distance Tool, TSWG Damage and Injury Distance Card Tool, START Simple Triage And Rapid Treatment Tool, Form Completion Tool, SOP Standard Operating Procedures Tools, Checklist Tools, Incident Reporting Tools. The CoBRA Command Package is compatible with electronic mail, wireless communications, local area network (wired or wireless), Internet file transfer and manual file transfer using a disk or other media. The CoBRA Incident Report can carry with it attachments, including digital imagery, standard report forms, or other digital documents. This greatly facilitates data transfer on-scene and provides a definitive record of activities during or after an incident. In addition CoBRA uses the XML open data standard for creating incident reports, allowing CoBRA incident reports to be digested by third party data base and records management systems. Since the checklists and guidelines in CoBRA support a variety of different types of emergency response, the use of CoBRA at all levels of an Incident Command System greatly facilitates the situational awareness of unit commanders, overall incident commanders, and any subsequent follow-up investigations, or other software programs known in the art in as well be incorporated into vehicle 10.

Each of the structural components can preferably be made of ballistic proof material, steel or other suitable material to enable the multiple functions of land and water use to be carried out. Each of the units described is exemplary for use with the invention and not intended to so limit the invention, rather modifications of these units are intended be covered hereby.

The composite armor ballistic resistant materials used in making the various components interior/exterior of the vehicle 10 integrate advanced polymer-matrix and metal-matrix composite materials which are preferably lightweight, quick exchange mission tailored having very high strength and brittle fibers which are combined with chemically resistant resins capable of being drawn out into thin layers and used as a building block to form a end result bulk material having a strength and stiffness nearing that of the fibers with the chemical resistance properties of the polymer. Composite materials can be used for both mobility and survivability as well as to achieve energy-absorbing armor equivalent to that of steel for ballistic protection while achieving a weight reduction factor of less than one-third the weight of steel. The composite materials that include two or more physically distinct and mechanically separable materials mixed in such a fashion that the dispersion of one material into the other material achieves the optimum physical characteristic properties desired for this project. A characteristic property of the constituent material is that of high-stiffness and high-strength reinforcing material that usually consists of a stand alone (a single/particular fiber type), fiber or multiple fiber types such as graphite, glass, kevalar, carbon, Aramid, to include Nano Composite Technologies (also known within the art), of various woven and inter-woven flat or tubular fibers or particles (cut, chopped at various lengths, ground to various consistencies of sizes of particles as well as braided or roped type designs can be used. The use of reinforcing materials either polymeric, such as polyethylene, polypropolene, such as Nylon 6 or Nylon 66 or ceramic or thermoplastics and Long Fiber thermoplastics that achieve very high strengths and stiffness at low densities. Another constituent material to be used can be a continuous "matrix" type i.e., (ceramic, polymer, metallic, thermo-plastics or Long Fiber thermoplastics), materials that can surround and envelope the reinforcing material to permeate the open space between the fibers or particles being used. Heat and/or pressure-based processing of the composite material matrix along with the reinforcing materials, using a variety of different techniques can result in the composite material matrix creating a composite ballistic resistant armor capable of defeating a wider range of small arms calibers and directed energy threats at a higher mass level of efficiency. For instance, a woven and or interwoven design layer of flat fibers in a front configuration layer, followed by woven and or interwoven braided or rope type design fibers configured in a secondary layer, followed by another layer of woven and or interwoven flat fibers design configured in a third layer, (followed by more consecutive layers if needed), impermeated with a host of different resin types (also known within the art), being incased within a variety of thermo-plastic and Long Fiber thermoplastics polymers, (that are also known within the art).

This provides reduced weights, lower profile signatures, reduced overall composite thicknesses, ending with lower composite armor manufacturing costs. Other armoring techniques can be incorporated along with the composite material matrix; for example, using both positive and reversed polarity electromagnetics along with liquid chemicals that destroy the physical properties of various munitions as an example, copper or lead bullets embedded into the composite materials matrix, electrified plating and electrified encapsulated ceramics to destroy the threat of explosive warheads, chemical energy warheads, shaped charge/tandem shaped charged/precision shaped charged warheads, explosively formed penetrators and the impact of high velocity kinetic energy penetrators. Further materials which can be employed include Non-Explosive Reactive Armor (NxRA), and Non-Energetic Reactive Armor (NERA), capable of possessing a good multi-hit ratio against shaped charged warheads, (NREA when used with other armors) as well as both armors are considered to be passive armor technologies that are inexpensive and relatively easy to integrate. NxRA uses gas generating or other non-explosive materials to create an energetic drive material with-in the armor; and Momentum Transfer Armor (MTA), technologies used in small compact modular configurations that use explosively launched small bars to collide into the side of kinetic-energy penetrators and destroy them through fracturing, deflection and rotation. MTA along with composite matrix materials could reduce volume and weight of an explosive charge needed to destroy a wide range of enemy munitions; Smart Armor (SA) is also another reactive armor technology that can be integrated with composite material matrix using sensors in conjunction with microprocessors in the armor as a threat defeat characteristic reducing the size, weight and space needed to employ the armor. The sensors would determine the location of the munitions impact, velocity, and diameter while the microprocessor calculates the time when the armor should be deployed. Explosive Reactive Armor (ERA), and Self Limiting Explosive Reactive Armor (SLERA), technologies could as well be possibly incorporated with the composite armor matrix materials. ERA is the single most effectively proven technology for destroying explosive and kinetic-energy anti-armor munitions.

Both ERA and SLERA armor technologies produce good multi-hit capabilities with-in modular configurations and both are inexpensive and easy to fabricate. Advanced ERA designs are considered to be advanced technologies providing protection against many anti-armor munitions. SLERA uses an explosive charge in an arrangement that limits the production of power generated from the initial blast of the charge to a controlled space. This produces a reduced performance when compared to the characteristics to ERA armoring technologies, however the reduced blast reaction does contribute to a reduced shock on the vehicles structure as well as the SLERA modules themselves. SLERA can be a passive armoring material with explosive charges designed with increased safety in mind, i.e., the vehicles reaction with-in itself as well as behavioral reactions with other advanced technologies to include the vehicles electronics systems and threat distinction systems.

The combination of an all terrain vehicle 10 is an important feature of the present invention. This combination uses the ability substantially all functional components being quickly attached to the vehicle 10 to delivery a needed utility to a given site or condition. The use of the vehicle 10 can allow for a particular unit to be dropped by aircraft and quickly installed at site to handle the particular situation.

What is claimed is:

1. An all-terrain vehicle equipped for quick exchange of its functional components and aid units, which includes:
    a frame having a mounting platform which includes a plurality of spatially positioned open surfaces;
    a removable engine having a quick release connector adapted to connect said engine to a first part of said mounting platform;
    a removable drive shaft having a quick release connector adapted to connect said drive shaft to a second part of said mounting platform and in an operably connected manner to said engine;
    a removable transmission having a quick release connector adapted to connect said transmission to a third part of said mounting platform and in an operably connected manner to said drive shaft;
    at least two removable axles each having a quick release connector adapted to connect said axles to a respective fourth part and fifth part of said mounting platform and in an operably connected manner to said transmission;
    a plurality of wheels each having a quick release connector adapted to connect to one of said axles; and
    a steering mechanism having wheels with a quick release connector adapted to connect said steering mechanism to a sixth part of said mounting platform and in an operably connected manner to said wheels and said transmission.

2. The all-terrain vehicle of claim 1, which includes a sealed hull to provide said vehicle with buoyancy and said mounting platform is formed about said hull.

3. The all-terrain vehicle of claim 1, which includes a weapons unit having a quick release connector adapted to connect said weapons unit to a seventh part of said mounting platform.

4. The all-terrain vehicle of claim 1, which includes a communications unit having a quick release connector adapted to connect said communications unit to a seventh part of said mounting platform.

5. The all-terrain vehicle of claim 1, which includes a firefighting equipment unit having a quick release connector adapted to connect to said firefighting equipment unit to a seventh part of said mounting platform.

6. The all-terrain vehicle of claim 1, which includes a microwave impulse equipment unit having a quick release connector adapted to connect to said microwave impulse equipment unit to a seventh part of said mounting platform.

7. The all-terrain vehicle of claim 1, which includes a water cannon unit having a quick release connector adapted to connect to said water cannon unit to a seventh part of said mounting platform.

8. The all-terrain vehicle of claim 1, which includes a search and rescue unit having a quick release connector adapted to connect to said search and rescue unit to a seventh part of said mounting platform.

9. The all-terrain vehicle of claim 1, which includes a firefighting equipment unit having a quick release connector adapted to connect to said firefighting equipment unit to a seventh part of said mounting platform.

10. The all-terrain vehicle of claim 1, which includes a medical unit having a quick release connector adapted to connect to said medical unit to a seventh part of said mounting platform.

11. The all-terrain vehicle of claim 1, which includes a surveillance unit having a quick release connector adapted to connect to said surveillance unit to a seventh part of said mounting platform.

12. The all-terrain vehicle of claim 1, which includes a fuel tank unit having a quick release connector adapted to connect to said fuel tank unit to a seventh part of said mounting platform.

13. The all-terrain vehicle of claim 1, which includes a cargo unit having a quick release connector adapted to connect to said cargo unit to a seventh part of said mounting platform.

14. The all-terrain vehicle of claim 1, which includes a hatch unit having a quick release connector adapted to connect to said hatch unit to a seventh part of said mounting platform.

15. The all-terrain vehicle of claim 1, which includes an imaging equipment unit having a quick release connector adapted to connect to said imaging equipment unit to a seventh part of said mounting platform.

16. The all-terrain vehicle of claim 1, which includes a field sensor unit having a quick release connector adapted to connect to said field sensor unit to a seventh part of said mounting platform.

17. The all-terrain vehicle of claim 1, which includes a remote control unit having a quick release connector adapted to connect to said remote control unit to a seventh part of said mounting platform.

* * * * *